Jan. 20, 1931. A. E. SAWYER 1,789,778
JACKING DEVICE FOR VEHICLES
Filed June 3, 1929  2 Sheets-Sheet 1

Inventor
Arthur E. Sawyer
by Wilkinson & Giusta
Attorneys.

Jan. 20, 1931.  A. E. SAWYER  1,789,778
JACKING DEVICE FOR VEHICLES
Filed June 3, 1929  2 Sheets-Sheet 2
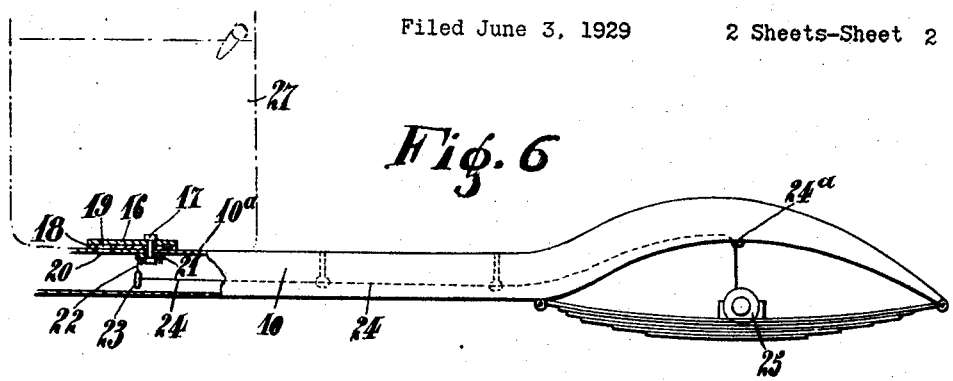
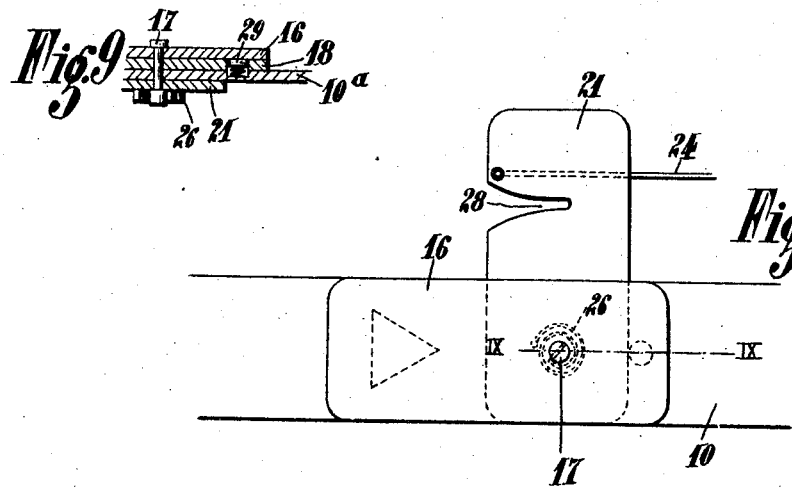
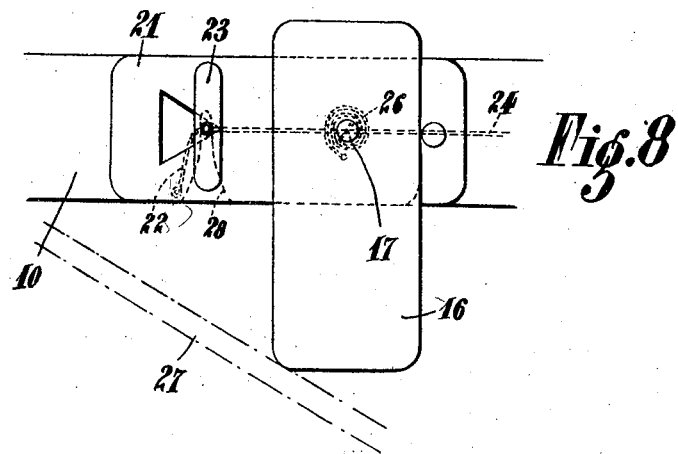
Inventor
Arthur E. Sawyer
by Wilkinson & Giusta
Attorneys.

Patented Jan. 20, 1931

1,789,778

UNITED STATES PATENT OFFICE

ARTHUR ESTCOURT SAWYER, OF PARIS, FRANCE

JACKING DEVICE FOR VEHICLES

Application filed June 3, 1929. Serial No. 368,090.

This invention is for improvements in or relating to jacking devices for vehicles, and has for one of its objects to facilitate the jacking up of the rear end thereof. In automobiles in particular, it is comparatively easy to insert a lifting jack into operative position to lift either of the front corners of the vehicle, but it is frequently difficult, especially when a luggage-carrier is fitted to the rear of the vehicle, to insert the jack into position to lift either of the rear corners of the vehicle. Such parts as are readily accessible towards the rear of the vehicle are not strong enough, or are not suitably designed to permit the thrust of a lifting jack to be applied under them, but it is a specific object of the present invention to provide a conveniently-accessible jacking abutment whereby either rear corner of the vehicle may be lifted.

The device according to the present invention will take various forms according to the construction of the vehicle to which it is applied, and, in order that the invention may be understood, several constructional forms of the invention will now be described by way of example only, and with reference to the accompanying drawings, in which Figure 1 is a side elevation of a portion of the rear end of an automobile having the present invention applied thereto, parts of the figure being broken away for the sake of clearness;

Fig. 6 is a side elevation of a device for connecting an axle directly to a chassis longitudinal when the jacking device is to be used.

Fig. 7 is an enlarged plan view of the device of Fig. 6 showing the connecting cable lying slack.

Fig. 8 is a view similar to that of Fig. 7 but with the parts moved into position for taking up the slack in the cable.

Fig. 9 is a fragmentary cross-section on IX—IX Fig. 7.

Like reference numerals indicate like parts throughout the drawings.

Figure 1:
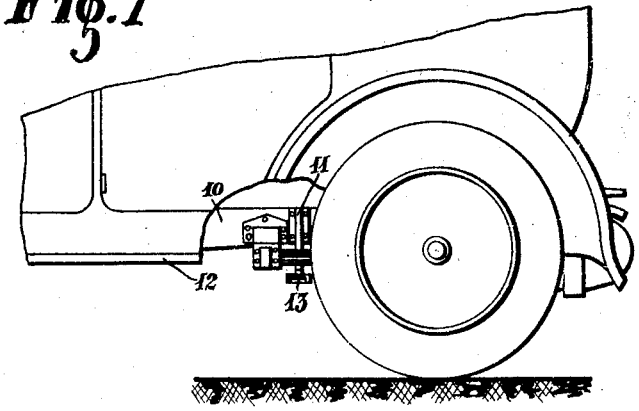
Figure 2:
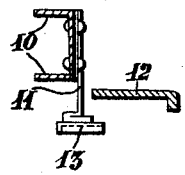
Figure 2 is a cross-section of certain of the parts shown in Figure 1, but on a larger scale.
Figure 3:
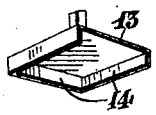
Figure 3 is a perspective view on a still larger scale, of one of the parts shown in Figure 2.

Referring firstly to Figures 1 to 3, each of the chassis longitudinals 10 of the automobile has attached to it, towards the rear end thereof, a jacking bracket 11 which reaches down so that its lower end is just below the level of the running-board 12. The lower end of the bracket is constituted by a bottom plate 13 which is rectangular in plan and along three of its edges has depending margins 14, see particularly Figure 3. The fourth edge has no margin, and it is this edge which lies towards the outside of the vehicle, being substantially parallel thereto. The bottom plate 13 lies immediately below the portion 11 of the bracket, so that the upward thrust of the lifting jack applied to the plate 13 will not tend to bend the portion 11. The margins 14 will serve to prevent undesired displacement of the lifting jack, while the absence of the margin from the outside edge of the plate will facilitate the insertion of the jack into its operative position. It will be appreciated that it would be a very simple matter for the jack to be slipped into position to raise the car, and since the bracket 11 can easily be made of ample strength, none of the parts will be unduly strained.

This construction is suitable for adoption on existing vehicles, though it can, of course, also be incorporated in the construction of new ones.

Figure 5:
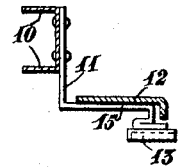
Figure 5 is a cross-section of certain of the parts shown in Figure 4, but on a larger scale.
Figure 4:
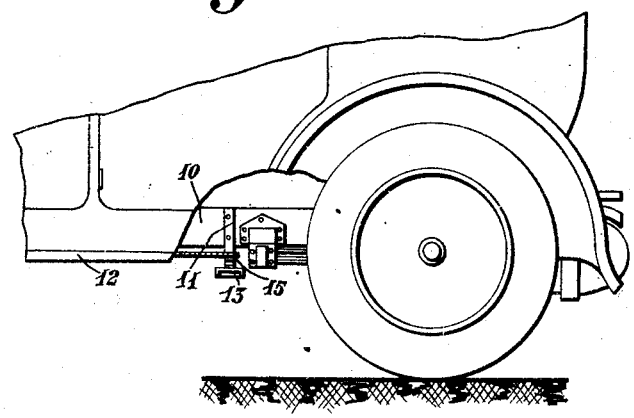
Figure 4 is a view corresponding to Figure 1, but showing a modified construction.

The construction shown in Figures 4 and 5 is more particularly suitable for adoption in the construction of new vehicles. In this modification, the bracket 11 has an extension 15 which reaches under, and supports, the running-board, thus enabling the jacking bracket to serve a double purpose. The jacking bracket 13 is in this case mounted at the end of the extension 15.

The foregoing description makes it clear that the jacking bracket is an integral part of the vehicle. The height of the lower end of the bracket could conveniently be made about the same as the height of the axis of the vehicle axle, so as to give ample ground-clearance.

In order that when the chassis longitudinal is jacked up, the back axle, and, consequently one or the other of the rear wheels, shall likewise be jacked up, it is necessary to provide some form of rigid attachment between the back axle and the longitudinal, otherwise the flexing of the rear springs under the weight taken by the back axle would prevent the latter from being raised above the ground.

Such rigid connection between the longitudinal and the back axle must only be established, of course, when it is desired to jack up the car, for it is obvious that when the car is in motion, the back axle must be allowed to follow every oscillation of the springs.

In Figs. 6, 7, 8 and 9, there has been illustrated a form of attachment between the chassis longitudinal and the back axle which normally is sufficiently slack not to interfere with the oscillations of the back axle, but which can be tightened up to provide a taut connection when it is desired to jack up the car.

The chassis longitudinal 10 carries on its upper face 10$^a$ a cover plate 16 rotatably mounted on a pin 17 which passes through said upper face 10$^a$. Between said cover plate 16 and the longitudinal 10 is a stationary intermediate plate 18 having an aperture 19 constantly in register with a corresponding aperture 20 of the longitudinal 10. The under portion of the upper face of the longitudinal 10 carries a second plate 21 likewise mounted on the pin 17 substantially at right angles to the cover plate 16 so as to rotate with the latter. To said second plate 21 is connected a wire 22 connected at its free end to a plug 23 to which is secured one end of a cable 24 the other end of which is attached to the back axle 25 of the automobile after passing through an eye-hole 24$^a$ in the longitudinal 10.

A coiled spring 26 connected to the plate 21 and pivot pin 17 tends to prevent rotation of said plate 21 and to maintain said plate 21 in the position of Fig. 7.

The cover plate 16 is located proximate a door 27 of the automobile, the intermediate plate 18 lying flush with the under surface of said door. When the cover plate 16 is in the position of Fig. 8 the door 27 cannot be closed, the cover plate 16 acting as a stop.

The mode of operation of this device is as follows:

Under normal circumstances, the cover plate 16 occupies the position illustrated in Fig. 7, in which it covers the two apertures 19 and 20 of the intermediate plate 18 and longitudinal 10 respectively. When it is desired to jack up the car, the cover plate 16 is rotated so as to uncover the apertures 19 and 20. Such rotation of the cover plate 16 brings the second plate 21 towards the aperture 20 in the longitudinal 10. So far the member 23 has been depending from the second plate 21, the cable 24 lying slack.

The wire 22 carrying with it the member 23 is now pulled through the two apertures 19 and 20 and the member 23 is laid over the top of the plate 18 as may be clearly seen in Fig. 8. In this manner the slack in the cable 24 is taken up. Further rotation of the cover plate 16 brings it into the position shown in Fig. 8. The second plate 21 now closes the apertures 19 and 20 so that the member 23 cannot be drawn back. A slot 28 is provided in the second plate 21 so that the cable 24 may pass down freely through the aperture 19 even though the latter is covered by said plate 21.

It will be observed that a spring pressed button 29, (Fig. 9) which normally is held inoperative by the cover plate 16, is released when the cover plate is in the position of Fig. 8 and then prevents further movement of the cover plate 16.

The cable 24 having been made taut in the manner previously described, the car can now be jacked up, the back axle 25 accompanying the chassis longitudinal 10 in its upward movement. Moreover, the operator by placing the jack under the running board instead of under one of the axles has avoided all contact with greasy parts which might soil his clothes.

When it is desired to return the device to its inoperative position, the button 29 is first depressed thereby releasing the cover plate 16. On rotating the latter, the second plate 21 uncovers the aperture 20 in the longitudinal 10, whereupon the member 23 is passed down through the apertures 19 and 20, taking the wire 22 with it. Further rotation of the cover plate 16, which is assisted by the spring 26, brings said cover plate back into the position of Fig. 7, and the cable 24 is slack once more.

It should be noted that as the door 27 cannot be closed while the cover plate 16 is in the position in which the cable 24 is taut, there is no danger of the motorist forgetting to go through the operations to slacken the cable 24 before driving off. Hence the device is practically fool-proof.

I claim:

1. The combination with a chassis longitudinal and an axle of an automobile, of a cover plate rotatably mounted on said longitudinal and adapted to be rotated into position in which it interferes with the closing of a door of said automobile, a second plate mounted to rotate with said cover plate and positioned at an angle thereto, and a cable attached to said axle and to said second plate and normally sufficiently slack not to interfere with the oscillations of said axle, the slack in said cable being taken up by rotation of said plates.

2. The combination with a chassis longitudinal and an axle of an automobile, of a cover plate rotatably mounted on said longitudinal and adapted to be rotated into position for interfering with the closing of a door of said automobile, a second plate mounted to rotate with said cover plate, said longitudinal having an aperture adapted to be closed either by said cover plate or by said second plate, a cable attached at one end to said axle, a plug, a wire secured to said second plate and at the free end of which said plug normally dangles, the other end of said cable being attached to said plug, said cable being sufficiently slack when said cover plate covers the aperture in said longitudinal to allow movement of said axle relative to said longitudinal, the slack in said cable being taken up by rotation of said plates and by drawing said plug up through the aperture in said longitudinal when uncovered by said cover plate, said plug being retained in position by said second plate which comes into position to cover said aperture.

3. The combination with a chassis longitudinal and an axle of an automobile, of a cover plate rotatably mounted on said longitudinal and adapted to be rotated into position for interfering with the closing of a door of said automobile, a second plate mounted to rotate with said cover plate, a cable connecting said axle to said second plate and normally sufficiently slack not to interfere with the oscillations of said axle, the slack in said cable being taken up on rotation of cover plate, and spring actuated means rendered operative after predetermined rotation of said cover plate for preventing further movement of said cover plate.

4. The combination with a chassis longitudinal and an axle of an automobile, of a cover plate rotatably mounted on said longitudinal and adapted to be rotated into position for interfering with the closing of a door of said automobile, a second plate mounted to rotate with said cover plate, said longitudinal having an aperture adapted to be closed either by said cover plate or by said second plate, a cable connecting said axle to said second plate and normally sufficiently slack not to interfere with the oscillations of said axle, the slack in said cable being taken up after rotation of said cover plate to uncover said aperture and before closure of said aperture by said second plate, by passing said cable up through said aperture, and means cooperating with said second plate to hold said cable taut.

ARTHUR ESTCOURT SAWYER.